United States Patent [19]

Pechhold et al.

[11] Patent Number: 5,447,755
[45] Date of Patent: Sep. 5, 1995

[54] SUBSTRATES TREATED WITH BIS(HYDROXYPHENYL) SULFONE STAIN-RESISTS

[75] Inventors: Engelbert Pechhold, Chadds Ford; Robert C. Buck, West Grove; Donald D. May, Chadds Ford, all of Pa.

[73] Assignee: E. I. du Pont de Nemours and Company, Wilmington, Del.

[21] Appl. No.: 286,973

[22] Filed: Aug. 5, 1994

Related U.S. Application Data

[63] Continuation-in-part of Ser. No. 187,975, Jan. 28, 1994, abandoned, which is a continuation-in-part of Ser. No. 12,794, Feb. 2, 1993, abandoned.

[51] Int. Cl.⁶ .............................................. B05D 3/02
[52] U.S. Cl. ................... 427/393.4; 8/115.54; 8/115.56; 428/96; 428/395; 428/474.4
[58] Field of Search ............ 8/115.51, 115.54, 115.56, 8/115.65, 929; 427/393.4; 428/95, 96, 97, 395, 474.4

[56] References Cited

U.S. PATENT DOCUMENTS

| | | | |
|---|---|---|---|
| 4,501,591 | 2/1985 | Ucci et al. | 427/393.4 X |
| 5,032,136 | 7/1991 | Fitzgerald et al. | 427/430.1 |
| 5,073,442 | 12/1991 | Knowlton et al. | 427/393.4 X |
| 5,074,883 | 12/1991 | Wang | 427/393.4 X |
| 5,131,909 | 7/1992 | Hangey | 8/115.6 |

FOREIGN PATENT DOCUMENTS

| | | |
|---|---|---|
| 2046966 | 1/1992 | Canada . |
| 467246A1 | 1/1992 | Germany . |

*Primary Examiner*—Michael Lusignan

[57] ABSTRACT

Polyamide fibrous substrates which resist staining by acid dyes and discoloration upon exposure to UV light, and processes for preparing the same which comprise applying, at pH 2 to 10, a base-catalyzed condensation product formed by the reaction of a bis(hydroxyphenyl)sulfone with formaldehyde to give a product known as a resole.

13 Claims, 1 Drawing Sheet

SUBSTRATES TREATED WITH BIS(HYDROXYPHENYL) SULFONE STAIN-RESISTS

CROSS-REFERENCE TO RELATED APPLICATION

This application is a continuation-in-part of application Ser. No. 08/187,975 filed Jan. 28, 1994, now abandoned, which in turn is a continuation-in-part of application Ser. No. 08/012,794, filed Feb. 2, 1993, now abandoned.

FIELD OF THE INVENTION

The present invention relates to polyamide substrates treated with an agent which imparts resistance to staining by acid dyes as well as resistance to discoloration upon exposure to ultraviolet. It relates also to a process for treating said substrates.

BACKGROUND OF THE INVENTION

Polyamide substrates, such as nylon carpeting and upholstery fabric and similar wool substrates, are subject to staining by a variety of agents. Acid dyes are especially troublesome staining agents, e.g. FD&C Red Dye No. 40, commonly found in soft drink preparations. Prior proposals for inhibiting staining of polyamide substrates by acid dyes include application of sulfonated phenolformaldehyde condensates, alone, or in combination with hydrolyzed maleic anhydride polymers or polymers of methacrylic acid, acrylic acid, or itaconic acid, or combinations of the same. It has been reported to be essential that the acid dye stain-resist agent contain acid groups in order to impart water-solubility to said condensates and polymers; i.e. sulfonic acid groups in the sulfonated phenol/formaldehyde condensates and carboxylic acid groups in the polymers of maleic anhydride, methacrylic acid and the like. It has also been reported that as the ratio of units containing one -SO3X radical to units containing no -SO3X radicals increases, the product becomes a better stain blocker. In addition, it 2has been reported that in order to be effective, stain-resists must be applied below pH of 4.5, preferably below 3.0; however, operating at such low pH has the potential for causing corrosion of equipment as well as safety and environmental problems.

Unfortunately, polyamide substrates treated with sulfonated phenolformaldehyde condensates suffer from discoloration when exposed to ultraviolet light (UV), limiting their usefulness. The UV-induced discoloration has been found to be primarily a result of discoloration of the sulfonated condensate itself, since polyamide substrates not treated with the condensates undergo significantly less discoloration upon similar exposure to UV light. It has been reported that when sulfonated phenol-formaldehyde condensates are applied to substrates at pH's between 2.5 and 7.0, greater discoloration caused by exposure to UV light was observed for the substrates to which the condensates had been applied at higher pH. It has also been reported that polyamide carpet treated with sulfonated phenolformaldehyde condensates had improved UV lightfastness when post-treated with acid solution but significantly worse UV lightfastness when post-treated with base solution. The stain-resistance of the treated carpet was not diminished with either treatment.

A formaldehyde/naphthol condensate having no carboxylic or sulfonic acid groups and having restraining effects to anionic dyes has been reported. However, our testing of the resulting compound, 2,2'-dihydroxy-1,1'-dinaphthylmethane, by the procedures described in the present specification showed it to be unacceptable as a stain-resist agent for polyamide fibers. On the other hand, base-catalyzed condensation products of a bis(hydroxy-phenyl)sulfone and formaldehyde have been described in the prior art as melt additives useful in improving the flame retardancy and thermal stability of polyamide fibers.

BRIEF SUMMARY OF THE INVENTION

The present invention relates to polyamide and wool fibrous substrates which resist both staining by acid dyes and discoloration upon exposure to ultraviolet light, and to a process for preparing the same. Such acid dye stain-resistance is imparted to polyamide or wool substrates by applying a non-sulfonated, non-carboxylated stain-resist agent prepared by the base-catalyzed condensation reaction of a bis(hydroxyphenyl)sulfone (BHPS) with formaldehyde.

DETAILED DESCRIPTION OF THE INVENTION

Figure 1:
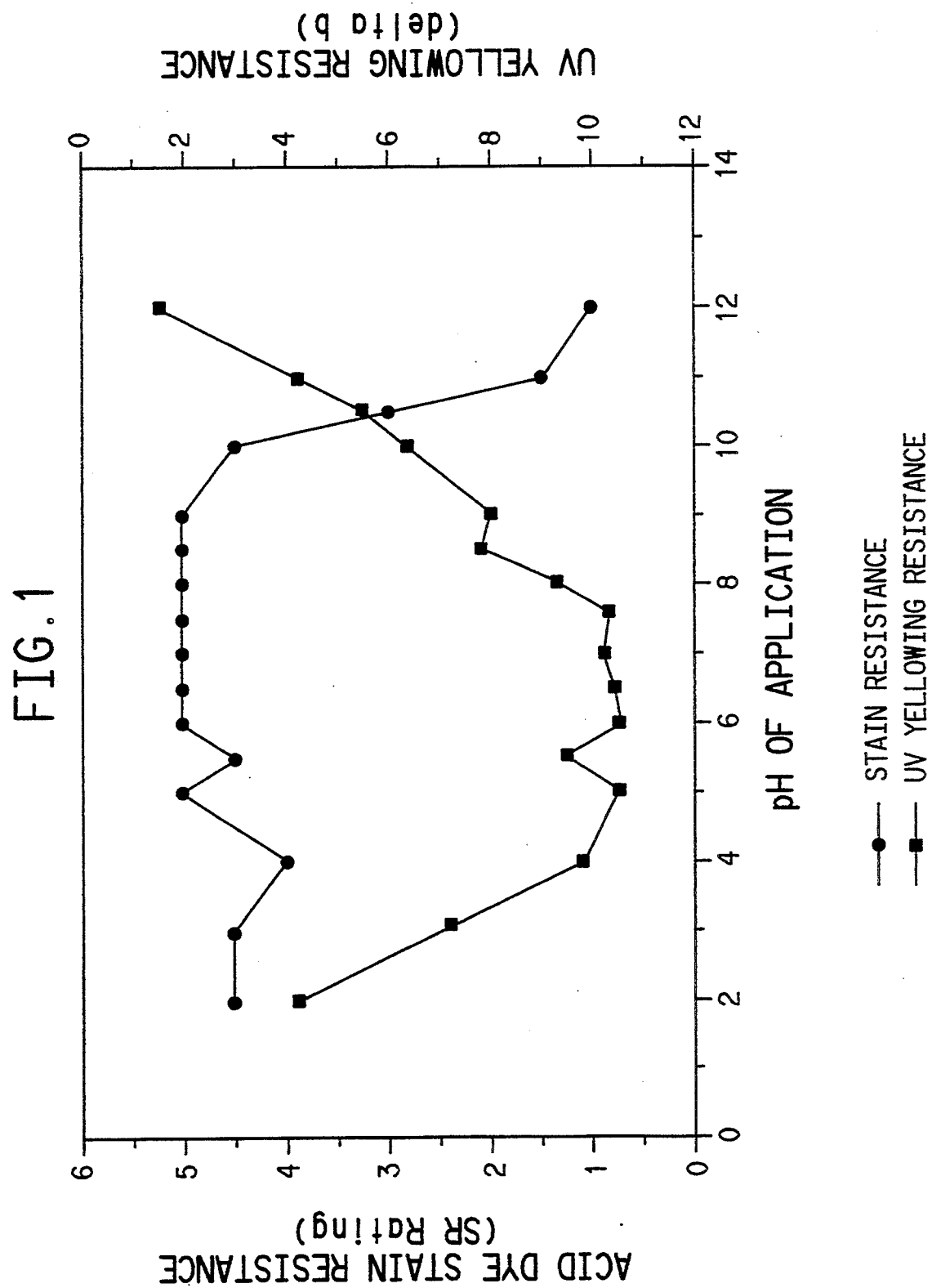
FIG. 1 shows a plot of UV discoloration-resistance as measured in delta b units and acid dye stain-resistance measured in Stain-Resist (SR) units for polyamide carpet samples treated with non-sulfonated resole condensates as a function of the pH of application of said condensates.

The base-catalyzed reaction of a bis(hydroxyphenyl)-sulfone (BHPS) with formaldehyde gives a product known as a resole which is water-soluble or water-dispersible. The resole stain-resist agents of this invention are less sensitive to the pH at which they are applied to the polyamide substrate than previously known stain-resists which were sulfonated or carboxylated or both. The stain-resists of this invention can be applied at higher pH values than the aforesaid prior art stain-resists. Moreover, in contrast to the need for sulfonic acid or carboxylic acid groups in prior art stain-resists, the base-catalyzed resole condensation products with which the substrates of this invention are treated contain no such sulfonic acid or carboxylic acid groups and yet are effective stain-resist agents when applied to polyamide or wool substrates. Thus, the resole stain-resists have been found to provide commercially adequate acid dye stain-resistance when applied at pH levels between 2 and 10 to polyamide substrates. The ability to treat substrates at pH above 4.5 affords these resoles significant advantages due to reduced equipment corrosion, safer handling, and improved environmental suitability. On the other hand, the UV-discoloration resistance of polyamide substrates treated with the non-sulfonated resole condensates of this invention varies more with change in pH than does the acid dye stain-resistance. A preferred embodiment of this invention provides a process for application of non-sulfonated resole condensates to polyamide and wool substrates which renders said substrates resistant to staining by acid dyes, and in addition reduces discoloration upon exposure of the treated substrates to ultraviolet light without the use of additional additives. In that preferred embodiment, the resole stain-resists, dissolved or dispersed in water, are applied to the polyamide substrates at a pH in the range between 2 and 4 or between 7.5 and 10.0, preferably at a pH in the range between 8.0. and 9.0. In an embodiment in which discoloration is not a concern, it is preferable to apply the resole stain-resists at a pH in the range between 6.0 and 8.0.

The BHPS used in this invention can be 4,4'-sulfonyl-diphenol or its isomers, such as 2,4'-sulfonyl-diphenol, 2,2'-sulfonyldiphenol, etc. or mixtures of the same. The base useful as the catalyst can be any inorganic compound having a pKa of 8.5 or greater which, when dissolved in water, renders it basic and which does not add to formaldehyde; for example, ammonia should not be used. Examples of such base include but are not limited to alkali metal hydroxides, alkali metal carbonates, alkali metal bicarbonates, alkali metal borates, alkaline earth metal hydroxides, alkaline earth metal carbonates, alkaline earth metal borates or mixtures thereof. The preferred base is sodium or potassium hydroxide, most preferably sodium hydroxide.

In preparing the resoles of this invention by the condensation of BHPS with formaldehyde, generally one uses a basic aqueous medium, elevated temperature, autogenous pressure, and for safety, under an inert atmosphere. The molar ratio of formaldehyde to BHPS is in the range between 0.6:1.0 and 4.0:1.0, preferably in the range between 0.6:1.0 and 1.1:1.0, and most preferably in the range between 0.7:1.0 and 0.9:1.0. The molar ratio of base to BHPS is in the range between 0.1:1.0 and 3.5:1.0, preferably in the range between 0.2:1.0 and 1.0:1.0. When the formaldehyde to BHPS molar ratio is in the range between 0.6:1.0 and 1.1:1.0, all of the base can be added at the start of the reaction at a preferred molar ratio of base to BHPS is in the range between 0.2:1.0 and 0.8:1.0. Too high or too low a molar ratio of base to BHPS yields a resole product which is incapable of imparting satisfactory acid dye stain-resistance to polyamide substrates. Reaction conditions may vary; i.e. in order to complete the condensation reaction, temperatures should be in the range between 100° and 200° C., and the reaction should be run over a time period of one-quarter hour to twenty four hours.

At formaldehyde to BHPS molar ratios in the range between 1.1:1.0 and 4.0:1.0, it is preferred that the base be added in two stages so as to prevent gellation. It is also preferred that in the range between 0.2 and 0.8 mole of base per mole of BHPS be added at the start of the reaction and that the reaction be run at 80°–100° C., preferably 100° C., for 4–12 hours, most preferably at 100° C. for 6 hours. After completion of the 4–12 hour reaction time period, additional base is added. The amount of additional base is in the range between 0.4 and 3.3 moles of base per mole of BHPS, preferably 1.0 mole of base per mole of BHPS. The reaction is then heated to a temperature in the range between 100° and 200° C., preferably in the range between 125° and 150° C., over a time period of one-quarter hour to 24 hours, preferably one-quarter to six hours. Reaction times at temperatures greater than 100° C. are monitored to prevent product gellation. If the molar ratio of formaldehyde to BHPS is too high without sufficient base present, gellation will occur and if the molar ratio of formaldehyde to BHPS is too low, a significant amount of unreacted BHPS will remain in the product and the reaction can yield a resole product which is incapable of imparting satisfactory acid dye stain-resistance to polyamide substrates. At the end of the condensation reaction, whether one or two stages, the product is cooled to room temperature, and, if necessary, dissolved in sufficient aqueous base to give a translucent brownish solution. Bases suitable for dissolving the resole resins of this invention are the same as those used in the condensation reaction.

Polyamide or wool substrates, for example fiber, yarn, textiles, or carpet, can be rendered stain-resistant to acid dyes when contacted with aqueous solutions or dispersions of the resole condensates at various pH values with or without electrolytes, and optionally surfactants, followed by steaming or heating. The resole condensates of this invention can be effectively applied by a wide variety of methods known to those skilled in the art, such as:

knife over roll overflow applicator (e.g., Kusters Roll), padding, spraying (e.g., Otting Spray Applicator), foaming in conjunction with foaming agents (e.g., Kusters Foam Applicator, Kusters Fluicon), batch exhaust in beck dyeing equipment, or continuous exhaust during a continuous dyeing operation (e.g., Kusters Flex-Nip, or Kusters Fluidyer). The resole condensates of this invention can be applied by the aforesaid methods to dyed or undyed polyamide textile substrates, or to polyamide fiber via a finish during fiber spinning, twisting, or heat setting. In addition, the resole stain-resists of this invention can be applied to such substrates in the absence or presence of fluorinated oil-, water-, and/or soil repellent materials. In the alternative, such a fluorinated material can be applied to the textile substrate before or after application of the resole stain-resists of this invention thereto. The quantities of the resole stain-resists of this invention which are applied to the polyamide fiber or textile substrate, are amounts effective in imparting stain-resistance. For practical reasons, the resoles of this invention are applied to polyamide fiber or fabric at concentrations which are as low as will be suitable for commercial applications. Such concentrations can be readily determined by those skilled in the art by using test methods which are well-known in the art, such as those set forth hereinbelow. For example, the stain-resist can be applied at a concentration in the range between 0.1 and 5.0% of the resole based on the weight of fiber or fabric (owf), preferably between 0.3 and 2.0% owf. The bath concentration is adjusted to the desired weight % with water.

In contrast to many prior art stain-resists which require application at a pH below 4 (preferably 3 or lower) in order to impart to polyamide substrates commercially adequate resistance to staining by acid dyes, the resole condensates of the present invention can be applied by any of the techniques described above at a pH between 2 and 10. A surfactant is required for application below pH 6, with more surfactant being necessary at lower pH than at a pH approaching 6. The amount of surfactant is that necessary to provide a homogeneous stable aqueous dispersion of the stain-resist or blend of stain-resist. Thus the required amount can be determined by one skilled in the art by observing the aqueous system in which it is used. For example, one can use an alkylated disulfonated diphenyl oxide (such as that sold by Dow Chemical Co. under the trademark Dowfax, by Pilot Chemical Co. under the trademark Calfax and by American Cyanamid Co. under the trademark Aerosol DPOS), alpha-olefin sulfonates (such as that sold by Pilot Chemical Co. under the trademark Calsoft) or sodium lauryl sulfates (such as that sold by Witco Chemical Co. under the trademark Duponol WAQE), usually in quantities in the range between 0.1% and 10% owf, preferably between 1% and 5% owf. Acid dye stain-resistance is enhanced by the use of electrolytes, usually at concentrations in the range between 2.5 and 500% based on the weight of resole condensate, preferably between 50 and 250%. The electrolyte can be any water-soluble compound which contains a monovalent or polyvalent cation or anion. Monovalent cations such as ammonium, lithium, sodium, potassium are preferred below pH 5.5. Polyvalent cations include barium, calcium, magnesium, strontium, aluminum, zinc, etc. Monovalent or polyvalent anions can be used in this invention, such as fluoride, chloride, bromide, iodide, hypochloride, chlorate, bromate, iodate, carbonate, bicarbonate, sulfate, sulfite, bisulfite, thiosulfite, thiosulfate, nitrate, nitrite, phosphate, hypophosphate, monohydrogen phosphate, dihydrogen phosphate, pyrophosphate, tripolyphosphate, polyphosphate, borate, silicate, metasilicate, cyanate, thiocyanate, formate, acetate, propionate, oxalate, tartrate, citrate, glycolate, thioglycolate, tetraborate, dithionate, etc. Exhaust or fixation the resole condensate can be accomplished at bath or solution temperatures ranging from 20° to 100° C. over a few seconds to one hour, preferably 50° to 80° C.

Polyamide or wool substrates treated in the aforementioned manner with non-sulfonated resole condensates are subject to discoloration when exposed to light which includes a component of ultraviolet light, such as sunlight or certain artificial light sources, and this discoloration may be measured quantitatively using methods known in the art. It has now been discovered that the degree of discoloration per unit of UV light exposure can be significantly reduced by varying the pH of the treatment bath from which the resoles are applied to the substrates. The degree of discoloration of a substrate may be measured by standard colorimetric methods and is commonly expressed in units of delta b, the difference in the measured b * values of an exposed substrate and an unexposed control sample. The human eye can detect discoloration of about 1 delta b unit with higher delta b values corresponding to increasingly more pronounced discoloration of the exposed substrate.

FIG. 1 shows the degree of UV-induced discoloration as expressed in units of delta b for a series of polyamide carpet substrates treated with a nonsulfonated resole condensate in the presence of surfactant and magnesium nitrate electrolyte as a function of pH of the treatment bath between pH 2 and pH 12. The figure also shows the degree of acid dye stain-resistance as expressed in Stain-resist (SR) units for these same substrates. It is apparent that the polyamide substrates exhibit excellent acid dye stain-resistance (SR 4 or above) when the resole condensate is applied from a treatment bath having a pH in the range of pH 2 to pH 10, with stain-resistance falling off significantly at above pH 10.

In respect of UV-induced discoloration, substrates treated with the resole condensates show extreme discoloration when applied in the pH range of pH 4 to pH 7.5 with delta b values greater than 9 upon exposure. However, it may be seen that the degree of UV-induced discoloration is reduced as the pH of application is lowered below pH 4 by the addition of a suitable acid, with lightfastness steadily improving as the pH is lowered further below pH 4. In sharp contrast with the sulfonated phenol-formaldehyde condensates of the prior art, however, the UV lightfastness of substrates treated with non-sulfonated resole condensates also improves significantly when the pH of the treatment bath is raised above pH 7.5 by the addition of a suitable base, with lightfastness steadily improving as the pH is raised further above pH 7.5.

The preferred acid for pH adjustment of the treatment bath to pH levels of 6 and lower is sulfamic acid, although other strongly acidic materials having low $pK_a$ values would also function for this purpose. As mentioned above, a surfactant must be present when applying the non-sulfonated resoles at acidic pH although the surfactant may also be present during application at non-acidic pH without significant negative effect. For adjustment of the treatment bath to pH levels in the range of pH 6 to pH 8, the preferred acid is citric acid, although again other acidic materials could be used as well. The preferred base for pH adjustment of the treatment bath to pH levels of 8 and higher is sodium carbonate, although other strongly basic materials having high $pK_a$ values of would also function for this purpose.

Thus, polyamide or wool substrates treated with non-sulfonated resole condensates in an aqueous treatment solution comprising the components described above exhibit both excellent stain-resistance to acid dyes along with reduced discoloration upon exposure to UV light when the treatment bath pH is adjusted to a value in the range between pH 2 and pH 4 or to a value in the range between pH 7.5 and pH 10, preferably to a value in the range of pH 8 to pH 9. Note that the optimum pH of application may vary with different substrates or treatment bath compositions and should be determined experimentally for a given substrate, non-sulfonated resole, surfactant, and electrolyte using methods known to those skilled in the art.

The following examples are given in further illustration of the invention but not by way of limitation. The kinematic viscosity of the resole stain-resists was determined at 10 weight % and pH 9 at 25° C. according to ASTM 446 using a Cannon-Fenske glass capillary.

EXAMPLE 1

Into a 100 ml 316 stainless steel shaker tube was charged 16.7 g (67 mmols), of 98% 4,4'-sulfonyldiphenol, 4.05 g (50 retools) of 37% aqueous formaldehyde, and 1.78 g (13 mmols) of 30 weight % sodium hydroxide in 40 ml of deionized water. The air was replaced by nitrogen before closing the tube. The reactants were then heated to 150° C. with shaking and held for 24 hours at this temperature under autogenous pressure. The tube was then cooled to room temperature and discharged after release of pressure. The grayish solid dispersed product was dissolved with 10 weight % sodium hydroxide to a tannish solution containing 13 weight % of BHPS resole condensate. The kinematic viscosity of a 10 weight % solution adjusted to a pH value of 9.0 measured at 25° C. was 1.38 centistokes.

EXAMPLES 2–8 & CONTROLS A–C

The resole condensate resins of Examples 2 through 8 and Controls A-C were prepared in a manner similar to Example 1 as described in Table 1.

TABLE 1

| Example | Formaldehyde (Mols per Mol BHPS) | NaOH (Mols per Mol BHPS) | Hrs. | Temp. °C. | Viscosity Centistokes |
|---|---|---|---|---|---|
| 1 | 0.75 | 0.2 | 24 | 150 | 1.38 |
| 2 | 0.75 | 0.6 | 24 | 150 | 1.42 |
| 3 | 0.75 | 0.8 | 24 | 150 | NM[1] |
| 4 | 0.9 | 0.4 | 24 | 150 | 1.59 |
| 5 | 1.0 | 0.4 | 24 | 150 | 2.01 |
| 6 | 1.1 | 0.4 | 24 | 150 | 59.85 |
| 7 | 0.75 | 0.4 | 12 | 160 | 1.47 |
| 8 | 0.75 | 0.4 | 6 | 170 | 1.42 |
| Control A | 0.75 | 0.0 | 24 | 150 | NM[2] |
| Control B | 0.5 | 0.4 | 24 | 150 | 1.05 |
| Control C | 1.2 | 0.4 | 24 | 150 | gelled |

[1]Not measured.
[2]Ibid.

EXAMPLE 9

Into a 400 ml stainless steel shaker tube was charged 83.4 g (0.33 mol) of a BHPS consisting of 90 weight % 4,4'-sulfonyldiphenol and approximately 10 weight % 2,4'-sulfonyldiphenol, 20.25 g (0.25 mol) of 37 weight % aqueous formaldehyde, and 18.0 g (0.13 mol) of 30 weight % sodium hydroxide in 200 ml deionized water. After replacing the air with nitrogen the tube was closed and heated with shaking for 24 hours at 150° C. The tube was then cooled to room temperature and discharged after release of pressure to give a grayish solid after filtration. This product was dissolved with 10 weight % sodium hydroxide to a tannish solution containing 19.8 weight % of BHPS resole condensate. The kinematic viscosity of a 10 weight % solution adjusted to a pH value of 9.0 measured at 25° C. was 1.66 centistokes.

EXAMPLE 10

Into a reaction flask equipped with a condenser, mechanical agitator and thermometer was charged 33.3 g (133 mmols) of 98 weight % 4,4'-sulfonyldiphenol, 7.57 g (93 mmols) of 37 weight % aqueous formaldehyde, 7.2 g (54 mmols) of 30 weight % sodium hydroxide and 80 g of deionized water. The reactants were refluxed at 100° C. under agitation and nitrogen for 24 hours. The resole condensate product was then cooled to room temperature, and enough 10 weight % sodium hydroxide was added to give a clear, tannish colored solution. The kinematic viscosity of a 10 weight % solution adjusted to a pH value of 9.0 and measured at 25° C. was 1.45 centistokes.

EXAMPLES 11-14 & CONTROLS D & E

The resole condensate resins of Examples 11 through 14 and Controls D and E were prepared in a manner similar to Example 10 as described in Table 2.

TABLE 2

| Example | Formaldehyde (Mols per Mol BHPS) | NaOH (Mols per Mol BHPS) | Hrs. | Temp. °C. | Viscosity Centistokes |
|---|---|---|---|---|---|
| 9 | 0.76 | 0.4 | 24 | 150 | 1.66 |
| 10 | 0.7 | 0.4 | 24 | 100 | 1.45 |
| 11 | 0.75 | 0.4 | 24 | 100 | 1.51 |
| 12 | 0.9 | 0.4 | 24 | 100 | 1.60 |
| 13 | 1.0 | 0.4 | 24 | 100 | 2.26 |
| 14 | 1.1 | 0.4 | 24 | 100 | 5.74 |
| Control D | 0.5 | 0.4 | 24 | 100 | 0.96 |
| Control E | 1.2 | 0.4 | 24 | 100 | gelled |

EXAMPLE 15

Into a one-gallon stirred autoclave was charged 202.5 g (2.5 mols), of 37 weight % aqueous formaldehyde, 834.0 g (3.34 mols) of BHPS consisting of 95 weight % 4,4'-sulfonyldiphenol and 5 weight % 2,4'-sulfonyldiphenol, 180 g (1.35 mols) of 30 weight % sodium hydroxide and 2000 g of water. The autoclave was sealed, swept with nitrogen and heated for 24 hours at 150° C. The reaction mixture was allowed to cool to about 70° C. before the addition of 300 g of 30 weight % sodium hydroxide. After stirring for 90 minutes, the reaction product was discharged as a translucent, homogeneous, amber colored liquid containing approximately 24.7 weight % of BHPS condensates. The kinematic viscosity of a 10 weight % solution adjusted to a pH value of 9.0 measured at 25° C. was 1.52 centistokes.

EXAMPLE 16

Into a reaction flask fitted with condenser, magnetic stirrer and thermocouple was charged 30 g (120 mmol) of 99.5 weight % 4,4'-sulfonyldiphenol, 15 g (185 mmol) of 37 weight % aqueous formaldehyde, 4 g (50 mmol) of 50 weight sodium hydroxide 2 g (10 mmol) sodium tetraborate hydrate and 155 g of deionized water. The contents were refluxed at 100° C. under agitation for 4 hours. Upon completion of reflux, the clear solution was heated to 125° C. for 4 hours in a stainless steel autoclave to give a yellow-brown viscous liquid.

EXAMPLE 17

Into a reaction flask fitted with condenser, magnetic stirrer and thermocouple was charged 20 g (80 mmol) of 99.5 weight % 4,4'-sulfonyldiphenol, 10.5 g (130 mmol) of 37 weight % aqueous formaldehyde, 2.5 g (30 mmol) of 50 weight % sodium hydroxide and 65 g of deionized water. The contents were refluxed at 100° C. under agitation for 6 hours and an additional 5 g (60 mmol) of 50 weight percent sodium hydroxide was added. The resulting mixture was heated for 16 additional hours at 100° C. After this time, the amber colored liquid solution was used as a stain-resist agent.

EXAMPLE 18

Into a reaction flask fitted with condenser, magnetic stirrer and thermocouple was charged 20 g (80 mmol) of 99.5 eight % 4,4'-sulfonyldiphenol, 12 g (148 mmol) of 37 weight % aqueous formaldehyde, 2.5 g (30 mmol) of 50 weight % sodium hydroxide and 65 g of deionized water. The contents were refluxed at 100° C. under agitation for 6 hours and an additional 10 g (120 mmol) of 50 weight percent sodium hydroxide was added. The resulting mixture was heated for 16 additional hours at 100° C. After this time the amber colored liquid solution was used as a stain-resist agent.

EXAMPLE 19

Into a reaction flask fitted with condenser, magnetic stirrer and thermocouple was charged 20 g (80 mmol) of 99.5 weight % 4,4'-sulfonyldiphenol, 6 g (74 mmol) of 37 weight % aqueous formaldehyde, 2.7 g (32 mmol) of sodium bicarbonate and 70 g of deionized water. The contents were refluxed at 100° C. under agitation for 24 hours. After this time, the amber colored liquid solution was used as a stain-resist agent.

EXAMPLE 20

Into a reaction flask fitted with condenser, magnetic stirrer and thermocouple was charged 20 g (80 mmol) of 99.5 weight % 4,4′-sulfonyldiphenol, 6 g (74 mmol) of 37 weight % aqueous formaldehyde, 11 g (40 mmol) of 50 percent aqueous sodium carbonate and 60 g of deionized water. The contents were refluxed at 100° C. under agitation for 24 hours. After this time, the amber colored liquid solution was used as a stain-resist agent.

EVALUATION METHOD I

Nylon fiber was treated with 1.2% owf resole condensate stain-resist at a goods-to-liquor ratio of 1:32 at the desired pH value for 45 minutes at 60, 70, or 80° C. in the presence or absence of 0.5–1.0% on the weight of the bath (owb) electrolytes such as sodium chloride or sodium sulfate. In some instances 0.1 to 5% owf of a commercial alkylated disulfonated diphenyl oxide surfactant ("Dowfax" 2A-4, Dow Chemical Co.) was added to the treatment bath. The fiber was then washed with water, air-dried and exposed at room temperature to a dye solution consisting of 0.2 g of FD&C Red Dye No. 40 and 3.2 g of citric acid in one liter of deionized water at a goods-to-liquor ratio of 1:40. After approximately 24 hours, the dye absorbed onto the fiber was determined at a wavelength of 498–502 nm by comparing the absorbance with that of a control. Thus a % dye absorbed number of 90 means 90% of the dye is absorbed, indicating little stain-resistance to the dye. The lower the number, the better is the resistance to stain. The results of the evaluations are set forth in Tables 3, 4, 5, 6 and 7.

TABLE 3

% DYE ABSORBED
80° C. - WITH SODIUM SULFATE - NO SURFACTANT

| EXAMPLE | pH 6.0–6.2[3] | pH 7.8–8.0 |
|---|---|---|
| 1 | 72 | 2 |
| 2 | 69 | 2 |
| 3 | 75 | 15 |
| 4 | NR[4] | 4 |
| 5 | 72 | 8 |
| 6 | NR[5] | 15 |
| 7 | 48 | 2 |
| 8 | 50 | 2 |
| 9 | 63 | 2 |
| 10 | 80 | 2 |
| 11 | 14 | 3 |
| 12 | 46 | 3 |
| 13 | 56 | 9 |
| 14 | 45 | 13 |
| 15 | 24 | 1 |
| 16 | 15.8 | 39.4 |
| 17 | 2.5 | 5.6 |
| 18 | 0.88 | 2.6 |
| 19 | 0.72 | 2.4 |
| 20 | 0.68 | 2.8 |
| Control A | 93 | 88 |
| Control B | 87 | 94 |
| Control D | 85 | 89 |
| Control F[6] | 75 | 75 |

[3]Treatment bath cloudy.
[4]Not run.
[5]Ibid.
[6]2,2′-dihydroxy-1,1′-dinaphthylmethane.

TABLE 4

Effect of pH, Surfactant and Electrolyte on Stain-Resistance
(Nylon 6/6 treated with 1.2% OWF
of Example 15 at 80° C., 45 min.)

| pH | DOWFAX 2A4[7] | Sodium Sulfate % OWB | % Dye Absorbed |
|---|---|---|---|
| 2.0 | No | 0 | 12 |
| 2.0 | Yes | 0 | 4 |
| 2.5 | No | 0 | 21 |
| 2.5 | Yes | 0 | 11 |
| 2.5 | Yes | 0.2 | 3 |
| 2.5 | No | 0.2 | 13 |
| 3.5 | No | 0 | 44 |
| 3.5 | Yes | 0 | 26 |
| 3.5 | Yes | 0.2 | 3 |
| 3.5 | No | 0.2 | 9 |
| 4.5 | No | 0 | 59 |
| 4.5 | Yes | 0 | 30 |
| 4.5 | Yes | 0.2 | 2 |
| 4.5 | No | 0.2 | 27 |
| 5.5 | No | 0 | 20 |
| 5.5 | Yes | 0 | 10 |
| 5.5 | Yes | 0.6 | 2 |
| 5.5 | No | 0.6 | 34 |
| 6.5 | No | 0 | 7 |
| 6.5 | Yes | 0 | 5 |
| 6.5 | Yes | 0.6 | 1 |
| 6.5 | No | 1.0 | 2 |
| 7.5 | No | 0 | 15 |
| 7.5 | Yes | 1.0 | 1 |
| 7.5 | No | 1.0 | 1 |

[7]Dodecyl diphenylether sulfonate surfactant.

TABLE 5

Effect of Electrolytes on Stain-resistance
Nylon 6/6 treated at 1.2% OWF of Example 15 at 80° C., 45 min

| pH | DOWFAX 2A4 | No Electrolyte | 0.2% NH₄Cl | 0.2% LiCl | 0.2% NaCl | 0.2% KCl | 0.2% Na₂SO₄ | 0.01% CaCl | 0.01% MgSO₄ |
|---|---|---|---|---|---|---|---|---|---|
| 2.5 | Yes | 11 | 1 | 0 | 1 | 1 | 1 | 4 | 5 |
| 3.5 | Yes | 26 | 1 | 0 | 1 | 1 | 3 | 9 | 8 |
| 4.5 | Yes | 30 | 1 | 0 | 1 | 1 | 1 | 13 | 11 |
| 5.5 | Yes | 10 | NM | NM | 1 | NM | 2 | NM | 0[8] |
| 6.5 | Yes | 5 | NM | NM | NM | NM | 1 | NM | 0[5] |
| 6.5 | No | 7 | NM | NM | 1 | 1 | 1 | NM | NM |
| 7.5 | Yes | 15 | NM | NM | NM | NM | 1 | NM | 1[5] |
| 7.5 | No | NM | NM | NM | NM | NM | 1 | NM | NM |

NM = not measured.
[8]0.07% OWB.

TABLE 6

Effect of Treatment Temperature on Stain-resistance
Nylon 6/6 treated with 1.2% OWF of Example 9
resole condensate and 1.0% OWB Sodium Sulfate Electrolyte

| pH | Temp. °C. | Dowfax 2A4 | % Dye Absorbed |
|---|---|---|---|
| 6.5 | 60 | Yes | 3 |
| 6.5 | 60 | No | 3 |
| 7.5 | 60 | Yes | 2 |

TABLE 6-continued

Effect of Treatment Temperature on Stain-resistance
Nylon 6/6 treated with 1.2% OWF of Example 9
resole condensate and 1.0% OWB Sodium Sulfate Electrolyte

| pH | Temp. °C. | Dowfax 2A4 | % Dye Absorbed |
|---|---|---|---|
| 7.5 | 60 | No | 3 |
| 6.5 | 70 | Yes | 4 |
| 6.5 | 70 | No | 10 |
| 7.5 | 70 | Yes | 2 |
| 7.5 | 70 | No | 0 |

EVALUATION METHOD II

The BHPS condensate prepared according to Example 15 was exhaust applied using a Launder-O-Meter onto 40 oz./sq. yd. carpet from Du Pont Antron® nylon 1150 bulk-continuous filament two-ply 3.75×3.75 twist, Superba heat set fiber using a 20:1 liquor-to-goods ratio. A Launder-O-Meter is an automated dyeing machine. The carpet sample is contained in each of several (up to twenty), 500 ml, stainless steel, screw-cap canisters. The canisters are held in a rack that rotates in a water bath whose temperature is automatically controlled for rate of heating, time at temperature, and cooling. Treatment bath temperature as well as electrolyte concentration were varied. After heat-treating for 20 minutes, the carpet samples were rinsed with water and the excess liquid removed by centrifugation. The samples were then oven-dried for 30 minutes at 90° C. and stain tested according to the procedure listed below. Results are given in Table 7.

STAIN-RESISTANCE EVALUATION METHOD

Acid dye stain resistance was evaluated using a procedure based on the American Association of Textile Chemists and Colorists (AATCC) Method 175-1991, "Stain Resistance: Pile Floor Coverings." A staining solution was prepared by mixing 0.2 grams of FD&C Red No. 40 and 3.2 grams of citric acid in one liter of deionized water. The carpet sample to be tested was placed on a flat non-absorbent surface and a hollow glass cylinder having a 5 cm diameter was placed tightly over the carpet sample. Twenty milliliters of the staining solution was poured into the cylinder and the solution was allowed to absorb completely into the carpet sample. The cylinder was then removed and the stained carpet sample was allowed to sit undisturbed for 24 hours, after which it was rinsed thoroughly under cold tap water and squeezed dry.

The carpet sample was then visually inspected and compared with standard stained carpet specimens having 5 relative levels of staining. By this approach, the amount of color remaining in the stained area of the treated carpet samples could be rated according to the following relative Stain Resistance (SR) scale:

5 = no staining
4 = slight staining
3 = significant staining
2 = considerable staining
1 = heavy staining Thus a stain rating of 5 is excellent, showing outstanding stain resistance, whereas 1 is the poorest rating, comparable with an untreated control sample.

TABLE 7

Stain-Resistance of Launder-o-Meter Treated Nylon 6/6 Carpet

| Example | % A.I.[9] owf | pH | Temp. °C. | % owb Electrolyte[10] | Stain Test | Shampoo Test |
|---|---|---|---|---|---|---|
| 15 | 0.4 | 7.0 | 66 | 0.4 | 3.5 | 3.0 |
| 15 | 0.4 | 7.0 | 66 | 1.5 | 4.5 | 4.0 |
| 15 | 0.6 | 7.0 | 66 | 0.4 | 4.5 | 4.0 |
| 15 | 0.4 | 7.0 | 77 | 0.4 | 4.5 | 4.0 |
| 15 | 0.4 | 7.0 | 85 | 0.4 | 5.0 | 4.5 |

[9] Active ingredient, condensate solids.
[10] 1.0% owb sodium sulfate.

EVALUATION METHOD III

At ambient temperature (about 20° C.), treatment baths containing the BHPS condensate of Example 15 were prepared, with varying pH and electrolyte concentration. At essentially the same temperature, the treatment baths were applied on a continuous dye range using a Kusters Flex-Nip onto 40 oz/sq. yd. carpet (from Du Pont Antron® nylon 1150 bulk-continuous twist, Superba heat set fiber) with 350% wet-pick-up (WPU), followed by heating in a vertical saturated cloud steamer for approximately two minutes. The carpet was then washed, vacuum extracted, and dried for approximately fifteen minutes at 250° F. in a horizontal electric tenter frame. Stain-resistance was evaluated by exposing 0.5 grams of fiber from the treated carpet to a room temperature solution consisting of 0.2 grams FD&C Red No. 40 and 3.2 grams citric acid in one liter of de-ionized water at a goods to liquor ratio of 1:40. After approximately 24 hours, the dye absorbed by the fiber was determined at a wavelength of 498–502 nm by comparing the absorbance with that of a control. Thus a dye absorption number of 90 means 90% of the dye was absorbed indicating little stain-resistance to the dye. The lower the number the better is the resistance to staining. The results of the evaluation are set forth in Tables 8 and 9.

TABLE 8

Stain-resistance of Flex-Nip Treated Nylon 6/6
Polyamide Carpets Resole Condensate with Electrolytes

| Example | % A.I. OWF | pH | Electrolyte g/L | Electrolyte Composition | % Dye (± 1%) Absorbed |
|---|---|---|---|---|---|
| 15 | 0.8 | 7.7 | 10.0 | $Na_2SO_4$ | 0.6 |
| 15 | 0.8 | 7.6 | 1.5 | Magnaflo[11] | |
| | | | 10.0 | $Na_2SO_4$ | 1.2 |
| 15 | 0.8 | 7.4 | 1.5 | Magnaflo | |
| | | | 2.0 | $Na_2SO_4$ | 1.3 |

[11] A commercially available, widely used, $Mg^{2+}$ salt solution sold by Sybron Chemicals Inc.

TABLE 9

Stain-resistance of Flex-Nip Treated Nylon 6/6 Polyamide
Carpets Resole Condensate with Electrolytes and Surfactant[12]

| Example | % A.I. OWF | pH | Electrolyte g/L | Electrolyte Composition | % Dye (± 1%) Absorbed |
|---|---|---|---|---|---|
| 15 | 0.8 | 6.7 | 2.0 | $Na_2SO_4$ | 0.0 |
| 15 | 0.8 | 6.2 | 2.0 | $Na_2SO_4$ | 0.0 |

[12] 10% on-weight of condensate Dowfax 2A4 surfactant.

EXAMPLES 21–36 AND CONTROL G

Samples of unlatexed polyamide carpet (2.5×5.5 inch samples of 40 oz./sq. yd. carpet composed of white Du Pont Antron®6,6-nylon 1150 bulk-continuous filament two-ply 3.75×3.75 twist, Superba heat set fiber) were scoured using standard mock dyeing conditions (25 minutes at 70°C. in a 1 liter aqueous solution containing 0.25 grams of Merpol DA surfactant (available from E.I. du Pont de Nemours & Co., Inc.) and 0.25 grams of trisodium phosphate). The samples were then allowed to air dry.

Treatment baths were prepared by mixing 0.5 grams (1% owf, i.e. weight percent based on weight of fiber) of non-sulfonated resole condensate (30% active ingredient in water solution) with 0.1 grams of Dowfax® 2A-4 surfactant (available from the Dow Chemical Co.). To this mixture was added 0.014 grams of magnesium nitrate electrolyte followed by dilution to 60 grams of solution with water and a sufficient amount of acid or base to yield a solution having the desired pH. The particular acid or base reagent employed was dependent upon the target pH, with 15% (w/w) aqueous sulfamic acid being used for adjustment below pH 8 and 5% (w/w) aqueous sodium hydroxide being used for adjustment to pH values between pH 8 and pH 12.

The scoured carpet samples were then exposed to the treatment baths for 5 minutes at room temperature at a goods-to-liquor ratio of 1 to 4. After treatment, the samples were steamed in a tray steamer for 5 minutes, rinsed with distilled water, centrifuged to remove the bulk water, and dried in a 200° F. forced-air drying oven for 10 minutes. As a control, a carpet sample was scoured and treated under identical conditions except that the treatment bath did not contain any resole condensate.

Following treatment, the carpet samples were tested for both stain-resistance and UV discoloration using the evaluation methods set forth below. The results of the evaluation are set forth in Table 10, and the data are plotted as a function of pH in FIG. 1.

TABLE 10

Stain-Resistance & UV Discoloration of Treated Carpet v. pH of Treatment

| Example | pH of Application | Resole in Bath | Stain Resistance | Discoloration (delta b) |
|---|---|---|---|---|
| 21 | 12 | Yes | 1 | 1.5 |
| 22 | 11 | Yes | 1.5 | 4.2 |
| 23 | 10.5 | Yes | 3 | 5.4 |
| 24 | 10 | Yes | 4.5 | 6.4 |
| 25 | 9 | Yes | 5 | 8.0 |
| 26 | 8.5 | Yes | 5 | 7.8 |
| 27 | 8 | Yes | 5 | 9.4 |
| 28 | 7.5 | Yes | 5 | 10.3 |
| 29 | 7 | Yes | 5 | 10.3 |
| 30 | 6.5 | Yes | 5 | 10.5 |
| 31 | 6 | Yes | 5 | 10.6 |
| 32 | 5.5 | Yes | 4.5 | 9.5 |
| 33 | 5 | Yes | 5 | 10.6 |
| 34 | 4 | Yes | 4 | 9.8 |
| 35 | 3 | Yes | 4.5 | 7.2 |
| 36 | 2 | Yes | 4.5 | 4.2 |
| Control G | 7 | No | 1 | <1 |

UV LIGHTFASTNESS EVALUATION METHOD

Ultraviolet lightfastness was evaluated using AATCC Method 16-1990/Option E, "Colorfastness to Light: Water-Cooled Xenon-Arc Lamp, Continuous Light." Samples were exposed to 40 AATCC Fading Units (AFU) of light. Discoloration of the carpet samples was then assessed using AATCC Method 153-1985, "Color Measurement of Textiles: Instrumental" using a Minolta CR-200 Chroma Meter calibrated using a calibration standard supplied with the instrument. The experimentally determined CIE tristimulus values were transformed by the Chroma Meter to CIE L*a*b* coordinates for evaluation of color difference. In CIE L*a*b* coordinate space, positive values of the b* coordinate denote yellowness. The resulting b* value of an exposed carpet sample is subtracted from the b * value of an unexposed control sample to give the degree of discoloration upon exposure as delta b.

We claim:

1. A process which comprises applying to a polyamide substrate, at a pH in the range between 2 and 10, an amount effective to provide said substrate with resistance to staining by acid dyes of an aqueous composition comprising a (a) non-sulfonated, non-carboxylated resole condensate prepared by reacting bis(hydroxyphenyl)sulfone with formaldehyde in the presence of a base comprising an inorganic compound having a pKa of 8.5 or higher, at a formaldehyde:bis(hydroxyphenyl)-sulfone molar ratio in the range between 0.6:1.0 and 4.0:1.0 and a base:bis(hydroxy-phenyl)sulfone molar ratio in the range between 0.1:1.0 and 3.5:1.0.

2. The process of claim 1 wherein said base is an alkali metal hydroxide, alkali metal carbonate, alkali metal bicarbonate, alkali metal borate, alkaline earth metal hydroxide, alkaline earth metal carbonate, alkaline earth metal borate or mixtures thereof.

3. The process of claim 2 wherein said formaldehyde:bis(hydroxyphenyl)sulfone molar ratio is in the range between 0.6:1.0 and 1.1:1.0.

4. The process of claim 2 wherein said formaldehyde:bis(hydroxyphenyl)sulfone molar ratio is in the range between 0.7:1.0 and 0.9:1.0.

5. The process of claim 2 wherein said base:bis(hydroxyphenyl)-sulfone molar ratio is in the range between 0.2:1.0 and 1.0:1.0.

6. The process of claim 2 wherein the pH of application of said aqueous composition is in the range between 7.5 and 10.0.

7. The process of claim 6 wherein the pH of application of said aqueous composition is in the range between 8 and 9.

8. The process of claim 2 wherein the pH of application of said aqueous composition is in the range between 2 and 4.

9. The process of either claim 1, 2, 3, 4, 5, 6, 7 or 8 wherein said aqueous composition contains an electrolyte comprising a water-soluble compound which contains a monovalent or polyvalent cation or anion.

10. The process of claim 9 wherein said bis(hydroxyphenyl)sulfone consists essentially of 4,4'-sulfonyldiphenol.

11. The process of claim 2 wherein said resole is prepared by reacting between 0.6 and 1.1 moles of formaldehyde per mole of 4,4'-sulfonyl-diphenol in the presence of 0.2 to 1.0 mole of an alkali metal hydroxide per mole of 4,4'-sulfonyldiphenol.

12. The process of claim 11 wherein the molar ratio of formaldehyde to 4,4'-sulfonyldiphenol is in the range between 0.7:1.0 and 0.9:1.0.

13. The process of claim 11 or 12 wherein said alkali metal hydroxide is sodium hydroxide.

* * * * *